United States Patent
Thiel et al.

(10) Patent No.: US 11,883,764 B2
(45) Date of Patent: Jan. 30, 2024

(54) SLUDGE WITHDRAWAL MECHANISM FOR WASTING AND RETURNING SETTLED SLUDGE FROM SECONDARY CLARIFIER WITH GRANULAR SLUDGE

(71) Applicant: EVOQUA WATER TECHNOLOGIES LLC, Pittsburgh, PA (US)

(72) Inventors: Donald J. Thiel, Waukesha, WI (US); Jeffrey P. Germait, West Allis, WI (US); Govardhan R. Katta, Hartland, WI (US); Allen Lepak, Mukwonago, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 17/907,967

(22) PCT Filed: Sep. 14, 2021

(86) PCT No.: PCT/US2021/050300
§ 371 (c)(1),
(2) Date: Aug. 30, 2022

(87) PCT Pub. No.: WO2022/056477
PCT Pub. Date: Mar. 17, 2022

(65) Prior Publication Data
US 2023/0191288 A1 Jun. 22, 2023

Related U.S. Application Data

(60) Provisional application No. 63/155,862, filed on Mar. 3, 2021, provisional application No. 63/077,799, filed on Sep. 14, 2020.

(51) Int. Cl.
*B01D 21/24* (2006.01)
*B01D 21/08* (2006.01)
*B01D 21/34* (2006.01)

(52) U.S. Cl.
CPC ......... *B01D 21/2427* (2013.01); *B01D 21/08* (2013.01); *B01D 21/245* (2013.01); *B01D 21/34* (2013.01)

(58) Field of Classification Search
None
See application file for complete search history.

(56) References Cited

U.S. PATENT DOCUMENTS 2,473,297 A 6/1949 Parker
2,509,695 A 5/1950 Parker
(Continued)

FOREIGN PATENT DOCUMENTS

JP H9-141006 A 6/1997
KR 20060095013 A * 8/2006
(Continued)

OTHER PUBLICATIONS

International Search Report in corresponding PCT/US2021/050300, dated Feb. 8, 2022.
(Continued)

*Primary Examiner* — Bradley R Spies
*Assistant Examiner* — Jeannie McDermott

(57) ABSTRACT

An apparatus for wasting flocculant sludge from a clarifier is provided including a wasting pipe fluidly connectable to a waste conduit, a manifold fluidly connectable to the wasting pipe, an upper header for collecting the flocculant sludge fluidly connectable to the manifold, a return sludge pipe fluidly connectable to a return sludge well, a lower header for collecting settled sludge fluidly connectable to the return sludge pipe, and a drive mechanism for rotating the
(Continued)

upper header and the lower header about a center axis. A wastewater treatment system is provided including the clarifier fluidly connectable to a source of a mixed liquor and the apparatus for wasting flocculant sludge. A method of separating settled sludge from a clarifier is provided including withdrawing flocculant sludge and withdrawing settled sludge. A method of retrofitting a clarifier is also provided including providing the manifold, the upper header, and the drive mechanism.

20 Claims, 6 Drawing Sheets

(56) References Cited

U.S. PATENT DOCUMENTS

| | | | |
|---|---|---|---|
| 2,779,730 A * | 1/1957 | Kelly | C02F 3/30 210/151 |
| 3,465,886 A * | 9/1969 | Karol | B01D 21/245 210/520 |
| 3,552,571 A | 1/1971 | Neuspiel et al. | |
| 3,951,816 A | 4/1976 | Bascope et al. | |
| 4,431,543 A * | 2/1984 | Matsuo | C02F 3/1215 210/906 |
| 4,931,175 A * | 6/1990 | Krofta | B03D 1/028 261/23.1 |
| 8,535,534 B2 | 9/2013 | Stroot | |
| 2005/0000910 A1 | 1/2005 | Kosanda et al. | |
| 2011/0198303 A1* | 8/2011 | Arbuthnot | B01D 21/20 210/800 |
| 2020/0048131 A1* | 2/2020 | Stensel | C02F 3/345 |
| 2020/0171412 A1* | 6/2020 | Powers | B01D 21/06 |

FOREIGN PATENT DOCUMENTS

| | | |
|---|---|---|
| KR | 20060095013 A | 8/2006 |
| WO | 9911353 A1 | 3/1999 |

OTHER PUBLICATIONS

Garcia A., Nuria, "Partial Supplementary European Search Report", European Patent Application No. 21867828.2, dated Oct. 24, 2023, 11 pages.

* cited by examiner

SLUDGE WITHDRAWAL MECHANISM FOR WASTING AND RETURNING SETTLED SLUDGE FROM SECONDARY CLARIFIER WITH GRANULAR SLUDGE

CROSS-REFERENCE TO RELATED APPLICATIONS

This application claims the benefit under 35 U.S.C. § 119 of U.S. Patent Application No. 63/077,799, titled "Sludge withdrawal mechanism for wasting and returning settled sludge from secondary clarifier with granular sludge," filed on Sep. 14, 2020 and U.S. Patent Application No. 63/155,862, titled "Sludge withdrawal mechanism for wasting and returning settled sludge from secondary clarifier with granular sludge," filed on Mar. 3, 2021, each of which is incorporated herein by reference in its entirety for all purposes.

FIELD OF TECHNOLOGY

Aspects and embodiments disclosed herein are directed toward systems and methods for the treatment of wastewater in a secondary clarifier.

SUMMARY

In accordance with one aspect, there is provided an apparatus for wasting flocculant sludge from a clarifier. The clarifier may comprise a center shaft positioned upright in the clarifier. The apparatus may comprise a wasting pipe having an inlet and an outlet fluidly connectable to a waste conduit. The apparatus may comprise a manifold having an inlet and an outlet fluidly connected to the wasting pipe inlet. The apparatus may comprise an upper header extending radially from the center shaft. The upper header may comprise a conduit having a plurality of orifices dimensioned to collect the flocculant sludge and an outlet fluidly connected to the manifold inlet. The upper header may be configured to be positioned within a disperse sludge zone of the clarifier. The apparatus may comprise a return sludge pipe having an inlet and an outlet fluidly connectable to a return sludge well. The apparatus may comprise a lower header extending radially from the center shaft. The lower header may comprise a conduit having a plurality of orifices dimensioned to collect settled sludge and an outlet fluidly connected to the return sludge pipe inlet. The lower header may be configured to be positioned within a settled sludge zone of the clarifier. The apparatus may comprise a drive mechanism configured to rotate the upper header and the lower header about a center axis of the clarifier.

In some embodiments, the upper header may be constructed and arranged to be positioned at an adjustable height along the center shaft.

In some embodiments, the upper header and the lower header may be constructed and arranged to extend radially in a substantially similar direction.

The upper header and the lower header may be fixed to create a dual conduit header.

In some embodiments, the upper header and the lower header may be constructed and arranged to extend radially in offset directions.

The upper header and the lower header may be constructed and arranged to rotate independently.

In some embodiments, the apparatus may further comprise a vacuum source configured to provide suction to the plurality of orifices of the upper header.

The upper header may comprise a first arm portion extending radially in a first direction and a second arm portion extending radially in a second direction.

In some embodiments, the apparatus may further comprise a second upper header extending radially from the center shaft constructed and arranged to be positioned above the upper header within the disperse sludge zone.

In some embodiments, the plurality of orifices of the upper header may be positioned with a predetermined spacing along the upper header to collect the flocculant sludge.

In accordance with another aspect, there is provided a wastewater treatment system. The wastewater treatment system may comprise a clarifier having an inlet fluidly connectable to a source of a mixed liquor and an effluent outlet. The clarifier may comprise a center shaft positioned upright in the clarifier. The system may comprise a wasting pipe having an inlet and an outlet fluidly connectable to a waste conduit. The system may comprise a manifold having an inlet and an outlet fluidly connected to the wasting pipe inlet. The system may comprise an upper header extending radially from the center shaft positioned within a disperse sludge zone of the clarifier. The upper header may comprise a conduit having a flocculant sludge inlet and an outlet fluidly connected to the manifold inlet. The system may comprise a return sludge well having an inlet and an outlet fluidly connectable to the source of the mixed liquor. The system may comprise a return sludge pipe having an inlet and an outlet fluidly connectable to the return sludge well. The system may comprise a lower header extending radially from the center shaft positioned within a settled sludge zone of the clarifier. The lower header may comprise a conduit having a settled sludge inlet and an outlet fluidly connected to the return sludge pipe inlet.

The system may further comprise a pump configured to direct the flocculant sludge to the waste conduit.

In some embodiments, the return sludge well may comprise a telescoping sludge valve configured to provide a hydraulic differential pressure effective to direct the settled sludge to the return sludge well.

The upper header may be positioned at an adjustable height along the center shaft. In some embodiments, the system may further comprise a controller configured to direct the upper header along the center shaft.

The system may further comprise a composition sensor fluidly connected to the waste conduit and operably connected to the controller. The controller may be configured to control the height of the upper header responsive to a measurement obtained by the composition sensor.

The system may further comprise a drive mechanism configured to rotate the upper header about a center axis of the clarifier. The system may further comprise a controller operably connected to the drive mechanism and configured to direct a rotation speed of the upper header.

In accordance with another aspect, there is provided a method of separating settled sludge from a clarifier. The method may comprise introducing a mixed liquor comprising an activated sludge into the clarifier. The method may comprise allowing the mixed liquor to settle an effective amount of the activated sludge forming a clarified zone comprising an effluent, a disperse sludge zone comprising flocculant sludge, and a settled sludge zone comprising settled sludge. The method may comprise withdrawing at least some of the flocculant sludge from the disperse sludge zone and directing the withdrawn flocculant sludge to waste. The method may comprise withdrawing at least some of the settled sludge from the settled sludge zone and directing the withdrawn settled sludge to an upstream treatment operation.

In some embodiments, withdrawing the at least some of the flocculant sludge comprises directing an upper header along the disperse sludge zone to collect the at least some of the flocculant sludge.

In some embodiments, withdrawing the at least some of the settled sludge comprises directing a lower header along the settled sludge zone to collect the at least some of the settled sludge.

The method may further comprise controlling a height of the upper header to collect the at least some of the flocculant sludge.

The method may further comprise determining a relative concentration of the flocculant sludge and the settled sludge in the waste and controlling the height of the upper header responsive to the relative concentration.

The method may further comprise controlling a rotation speed of the upper header to collect the at least some of the flocculant sludge.

The method may further comprise controlling a rotation speed of the lower header to control mixing within the settled sludge zone.

In accordance with another aspect, there is provided a method of retrofitting a clarifier comprising a center shaft positioned upright in the clarifier. The method may comprise providing a manifold having an inlet and an outlet. The method may comprise providing an upper header constructed and arranged to extend radially from the center shaft comprising a conduit having a plurality of orifices and an outlet fluidly connectable to the manifold inlet. The method may comprise providing a drive mechanism configured to rotate the upper header about a center axis of the clarifier.

In some embodiments, the method may comprise providing a wasting pipe having an inlet and an outlet fluidly connectable to a waste conduit, the manifold outlet being fluidly connectable to the wasting pipe inlet.

In some embodiments, the method may comprise providing a lower header constructed and arranged to extend radially from the center shaft comprising a conduit having a plurality of orifices and an outlet.

The method may comprise providing a return sludge pipe having an inlet and an outlet fluidly connectable to a return sludge well, the lower header outlet being fluidly connectable to the return sludge pipe inlet.

The method may comprise providing a second upper header constructed and arranged to extend radially from the center shaft.

The method may comprise providing a controller operably connectable to the drive mechanism configured to direct a rotation speed of at least one of the upper header, the lower header, and the second upper header about a center axis of the clarifier.

The method may comprise providing a vacuum source configured to provide suction to the plurality of orifices of the upper header.

The method may comprise providing a controller operably connectable to the upper header and configured to position the upper header at a predetermined height along the center shaft.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
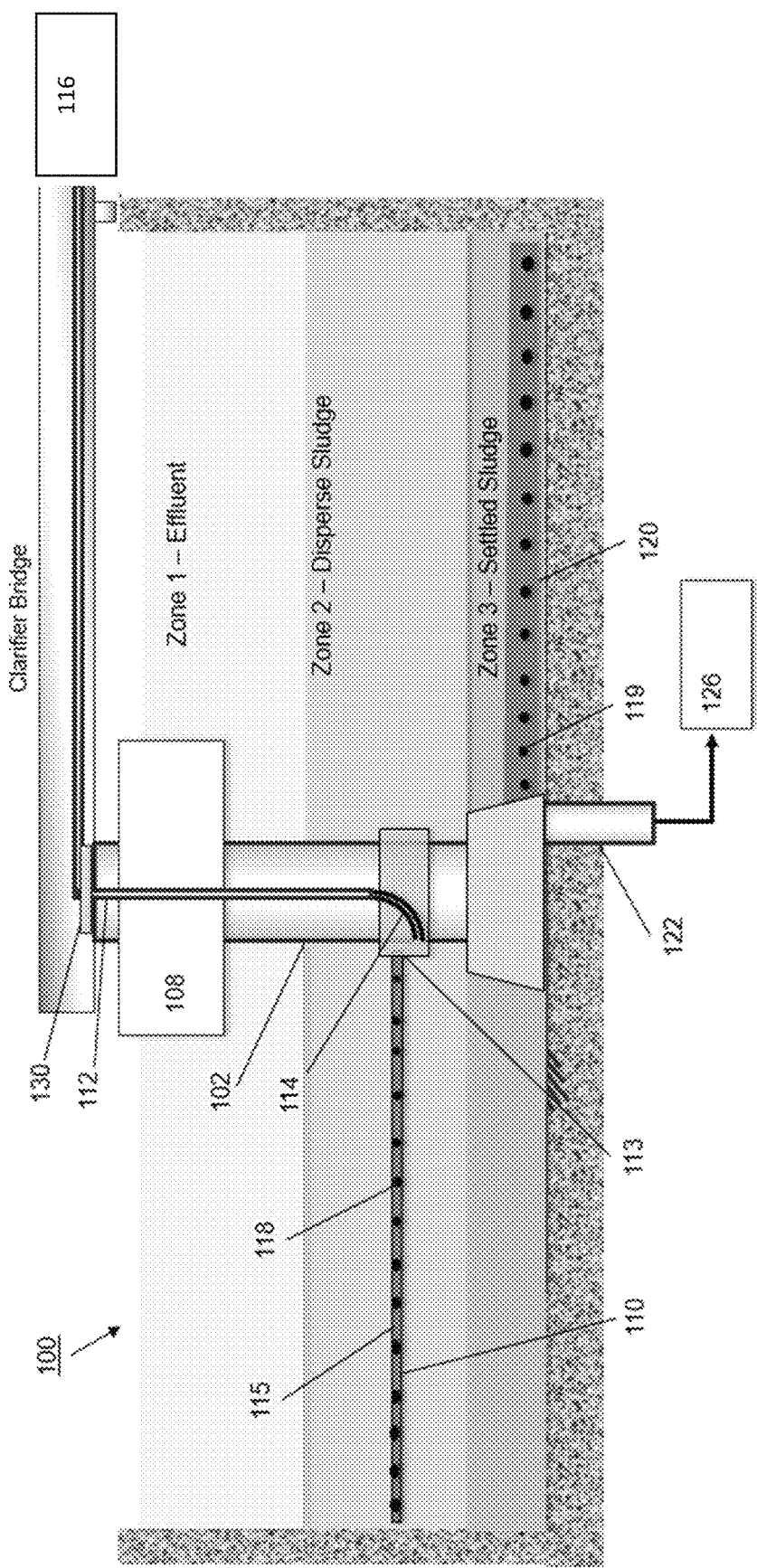
FIG. 1 is a schematic drawing of an apparatus for wasting flocculant sludge from a clarifier, according to one embodiment.

Aspects and embodiments disclosed herein are directed toward systems and methods for treating wastewater. As used herein the term "wastewater" includes, for example, municipal wastewater, industrial wastewater, agricultural wastewater, and any other form of liquid to be treated containing undesired contaminants. Aspects and embodiments disclosed herein may be utilized for primary wastewater treatment, secondary wastewater treatment, or both. Aspects and embodiments disclosed herein may remove sufficient contaminants from wastewater to produce product water that may be used for, for example, irrigation water, potable water, cooling water, boiler tank water, or for other purposes.

The systems and methods disclosed herein are directed to improvements in separating settled sludge from a clarifier. In particular, the methods are directed to improvements in recovering high quality settled sludge. Wastewater treatment systems often include biological treatment. Biological treatment generally involves adding oxygen, mixing, or a combination thereof, to provide treatment by converting biochemical oxygen demand (BOD) to microorganisms to form biological flocs. The microorganism population is capable of breaking down organic contaminants in the wastewater to produce a mixed liquor and activated sludge.

The methods may comprise introducing the mixed liquor comprising activated sludge into a clarifier. In the clarifier, the activated sludge formed during biological treatment is allowed settle to the bottom of the reactor to form settled sludge. The settling generally forms a clarified zone comprising an effluent in a top layer of the clarifier and a settled sludge zone comprising the settled sludge in a bottom layer of the clarifier. The effluent is withdrawn as treated water. The settled sludge may be recycled to an upstream treatment operation, such as a dissolved air flotation unit or biological treatment unit.

One potential operational issue with a conventional clarifier system is that sludge does not settle well, leaving a disperse sludge zone comprising flocculant (poor settling) sludge in an intermediate layer of the clarifier. The systems and methods described herein may be used to selectively waste the poor settling sludge, also referred to as flocculant sludge, such that the settled sludge including heavy solids, such as granular activated sludge and ballasted sludge, is selectively recycled, enhancing settling characteristics of the system. The methods may help alleviate the problem of excessive settle times and poor treatment due to poor settling sludge.

The methods may include withdrawing flocculant sludge from the disperse sludge zone and directing the flocculant sludge to waste. The methods may include withdrawing settled sludge from the settled sludge zone of the clarifier and directing the settled sludge to an upstream operation, for example, as a return activated sludge. The settled sludge may include, for example, granular activated sludge and/or ballasted sludge. It is believed that by withdrawing flocculant sludge, the return activated sludge will contain a greater proportion of faster settling sludge and a lower proportion of poor settling sludge.

Aspects and embodiments disclosed herein include using a ballasted activated sludge. In some embodiments, magnetite may be utilized as the ballast material. Due to the high density (about 5.2 g/cm$^3$) and hydrophobic characteristics of magnetite, it tends to settle rapidly when it is introduced to the clarifier. The ballast particles are generally highly recoverable and reusable (up to 99%), which further helps keep operational costs low. With the substantial acceleration of settling, the footprint of the clarifier utilized in the systems disclosed herein may be much smaller with better effluent quality (for example, lower suspended solids).

In some embodiments, ballast material may be separated from the effluent or waste stream and recovered. For example, the withdrawn waste or effluent may be directed to a ballast recovery unit. In exemplary embodiments, the withdrawn waste or effluent may be directed to a CoMag® and/or BioMag® (Evoqua Water Technologies LLC, Pittsburgh, PA) system or a tertiary filter. From the filter the ballast material may be captured and returned to the system upstream with the return activated sludge.

Aspects and embodiments disclosed herein include using a granular activated sludge. Granular activated sludge may refer to rapid settling sludge as measured by the Sludge Volume Index (SVI). SVI is a mathematical calculation that takes into account a 30-minute settleability test result and an activated sludge mixed liquor suspended solids (MLSS) test result to produce a number (or index) that describes the ability of the sludge to settle and compact. SVI may give a more accurate picture of the sludge settling characteristics than settleability or MLSS alone. The SVI formula is shown below.

$$SVI\,(\text{mL/g}) = \frac{\text{Settled Sludge Volume (mL/L)}}{\text{Mixed Liquor Suspended Solids (g/L)}} \times 1{,}000$$

SVI may generally provide an indication of changes occurring in the activated sludge treatment process. By trending SVI data over a period of time, operators may discover potential problems and even prevent certain problems from occurring. The optimum operating SVI is generally specific to the wastewater treatment plant. SVI should ideally be determined when the treatment plant is running at an optimum level. The measured or calculated SVI during optimum plant performance may be used as a benchmark.

The SVI 5 (settleability reading at 5 minutes) of granular activated sludge is generally equivalent to about an SVI 30 (settleability reading at 30 minutes) of conventional sludge. The use of granular activated sludge may allow operation of the biological reactor at a much higher MLSS concentration (for example, around 9-10 g/L), reducing the necessary aeration reactor volume and operation cost. Granular activated sludge is typically used in sequencing batch reactor (SBR) systems. However, to form the granules during operation, there is a need to maintain vertical flow within the reactor. With an SBR, this requires mounting the effluent launders on top of the reactors with a spacing of not more than 6 m. The launders add complexity to the system, lessening their appeal to broader market, particularly when large plants (which tend to be based on conventional activated sludge) need to be converted to granular sludge plants. In such plants, the existing secondary clarifier may need to be repurposed or abandoned altogether.

The systems and methods disclosed herein may instead use granular activated sludge in a clarifier, such as a secondary clarifier, which maintains vertical flow. The granular activated sludge may be collected and returned to the upstream biological treatment unit. To maintain a high relative concentration of granular activated sludge in the return, the systems and methods remove flocculant sludge, which is directed to waste.

In certain embodiments, the methods may include withdrawing the flocculant sludge by directing an upper header along the disperse sludge zone to collect the flocculant sludge. A lower header may be directed along the settled sludge zone to collect the settled sludge. The flocculant sludge and the settled sludge may be withdrawn substantially simultaneously. For instance, the upper header and the lower header may be rotated about a center axis of the clarifier substantially simultaneously. Suction may be applied to one or both of the upper header and the lower header. Suction may be applied by a vacuum source, for example, a pump, or by utilizing hydraulic differential pressure.

The methods may include controlling a rotation speed of the upper header and/or the lower header. Rotation speed of the upper header may be controlled to collect the flocculant sludge. Rotation speed of the lower header may be controlled to control mixing of the settled sludge zone. For instance, rotation speed of the lower header may be controlled to reduce a chance of resuspending settled sludge and/or minimize disturbance to the settled sludge within the settled sludge zone. In other embodiments, rotation speed of the lower header may be controlled to induce mixing of the settled sludge in the clarifier.

Each of the upper header and the lower header may be independently controlled. In some embodiments, the upper header and the lower header may rotate independently. The upper header and the lower header may rotate simultaneously. However, for independent and simultaneous rotating speeds, the upper header and the lower header may rotate in a substantially similar direction or in radially offset directions. Rotation speeds relative to each other may be selected to control collection of flocculant sludge and/or mixing of the settled sludge zone, as previously described.

The methods disclosed herein may comprise controlling a height of the upper header. In general, the methods may comprise positioning the upper header in a disperse sludge zone of the clarifier. The disperse sludge zone may be defined by a relatively high concentration of flocculant or poor settling sludge and a relatively low concentration of settled sludge in the fluid. In some embodiments, the disperse sludge zone may be defined by a 2:1 ratio of flocculant sludge to settled sludge, for example, a 5:1 ratio, a 10:1 ratio, a 50:1 ratio, a 100:1, ratio or greater. Thus, the disperse sludge zone may be variable with varying conditions of the partially settled mixed liquor within the clarifier. For instance, settle time, mixing, and influent mixed liquor flow rate may each have an effect on the disperse sludge zone. The methods may comprise controlling the height of the upper header to correspond with the location of the disperse sludge zone.

In some embodiments, the methods may comprise determining a relative concentration of the flocculant sludge and the settled sludge in the waste. For instance, the recovery of settled sludge from the waste may be used to determine the relative concentration of flocculant sludge to settled sludge being wasted. The height of the upper header may be controlled responsive to the relative concentration, for example, to position the upper header within the disperse sludge zone. The systems and methods may generally operate to increase a relative amount of flocculant sludge directed to waste and reduce an amount of settled sludge directed to waste.

In accordance with certain embodiments, there is provided an apparatus for wasting flocculant sludge from a clarifier. The apparatus may be utilized in a secondary clarifier. The clarifier may generally a have a mixed liquor inlet and an effluent outlet. The clarifier may comprise a center shaft positioned upright in the clarifier. The center shaft may be fixed at a center axis of the clarifier. In some embodiments, the center shaft may be rotationally fixed. In other embodiments, the center shaft may be rotatable, for example, driven by a rotating drive mechanism, such as a center drive or a peripheral drive unit.

Figure 2:
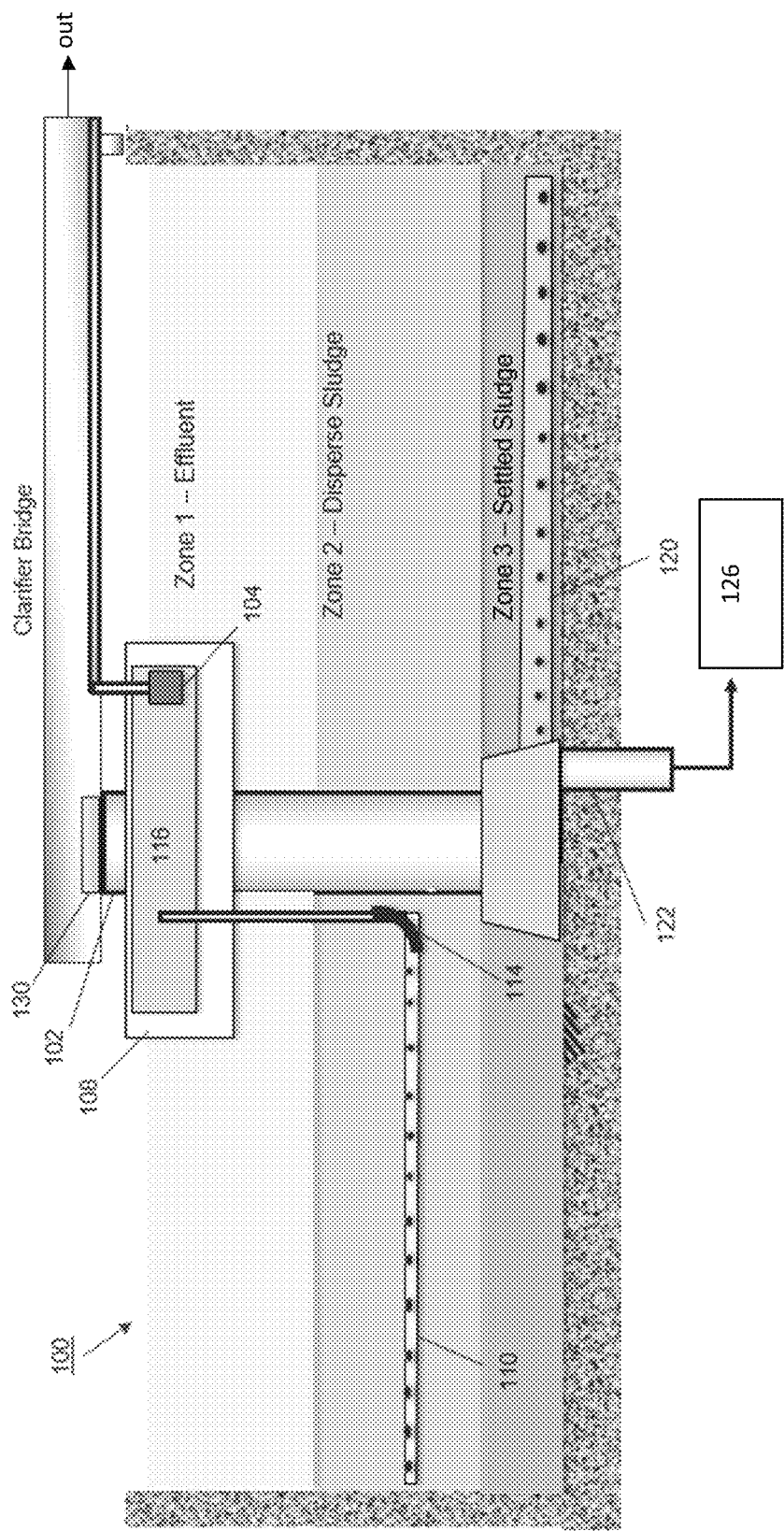
FIG. 2 is a schematic drawing of an apparatus for wasting flocculant sludge from a clarifier, according to one embodiment.

An exemplary apparatus is shown in FIG. 1. The apparatus may be constructed and arranged to be positioned in the clarifier 100. The exemplary clarifier 100 of FIG. 1 includes an influent well 108 and center shaft 102. The apparatus may comprise a wasting pipe 112 having an inlet and an outlet fluidly connectable to a waste conduit 116. The apparatus may comprise a manifold 114 having an inlet and an outlet fluidly connected to the wasting pipe 112 inlet. In some embodiments, as shown in FIG. 1, the wasting pipe 112 may be directed through an internal conduit of the center shaft 102. In other embodiments, as shown in FIG. 2, the wasting pipe 112 may be external to the center shaft 102.

The apparatus may comprise an upper header 110 extending radially from the center shaft 102. The upper header 110 may be configured to be positioned within a disperse sludge zone of the clarifier 100 for collection of the flocculant sludge. The upper header 110 may have a ring portion 113 surrounding the center shaft 102 and an arm portion 115 extending from the ring portion 113, as shown in FIG. 1. In other embodiments, the upper header 110 may comprise an arm portion 115 without a ring portion (as shown in FIG. 2). In some embodiments, the ring portion 113 of the upper header 110 may be driven to rotate about a center axis of the clarifier 100, surrounding a rotationally fixed the center shaft 102. A drive mechanism 130 may rotate the upper header 110. In other embodiments, the upper header 110, for example a ring portion 113 of the upper header 110, may be fixed to a rotating center shaft 102. In such embodiments, the center shaft 102 may be driven to rotate about a center axis of the clarifier 100. The drive mechanism 130 may rotate the center shaft 102.

The upper header 110 may comprise more than one arm portion 115, for example, a first arm portion extending radially in a first direction and a second arm portion extending radially in a second direction. The first arm portion and the second arm portion may extend in substantially opposite directions. The first arm portion and the second arm portion may extend in offset directions by a predetermined angle, for example, about 45°-90°, 90°-135°, or 135°-180°.

The upper header 110 may comprise a conduit having a plurality of orifices 118 dimensioned to collect the flocculant sludge as the arm portion 115 of the upper header 110 rotates about the center axis of the clarifier 100. The upper header 110 may have an outlet fluidly connected to the manifold 114 inlet. Thus, flocculant sludge collected through the plurality of orifices 118 may be directed to the waste conduit 116 via the manifold 114 and wasting pipe 112.

The plurality of orifices 118 may each independently have a predetermined size selected to collect the flocculant sludge. Orifice 118 size may be selected based on the amount of sludge that each orifice 118 must remove to assure hydraulic balance for proportional sludge withdrawal volumes. Thus, orifice 118 size may be dependent on the flow it must accept and headloss at that point in the header. Orifice 118 size may increase or decrease proportionately along a length of arm portion 115. In some embodiments, orifices 118 at a distal end of the arm portion 115 may be sized smaller than orifices 118 at a proximal end of the arm portion 115. In other embodiments, orifices 118 at a distal end of the arm portion 115 may be sized larger than orifices 118 at a proximal end of the arm portion 115. In yet other embodiments, orifices 118 at a center of the arm portion 115 may be sized smaller or larger than orifices 118 at the ends of the arm portion 115.

In some embodiments, the plurality of orifices 118 may be positioned with a predetermined spacing along the arm portion 115 of the upper header 110 to collect the flocculant sludge. Orifices 118 may be spaced with no more than a predetermined spacing, for example, 30 in (762 mm) apart, to reduce a maximum distance that the sludge has to travel between orifices 118. The spacing may be selected to reduce or eliminate the possibility of sludge going over the header or by-passing the orifice. The predetermined spacing may be selected to collect flocculant sludge. In some embodiments, orifices 118 at a distal end of the arm portion 115 may be closer together than orifices 118 at a proximal end of the arm portion 115. In other embodiments, orifices 118 at a distal end of the arm portion 115 may be farther apart than orifices 118 at a proximal end of the arm portion 115. In yet other embodiments, orifices 118 at a center of the arm portion 115 may be closer together or farther apart than orifices 118 at the ends of arm portion 115.

In some embodiments, the upper header 110 may be constructed and arranged to be positioned at an adjustable height along the center shaft 102. Thus, the upper header 110 may be movable up and down along the center shaft 102. The upper header 110 may be movable to correspond with the disperse sludge zone during operation of the clarifier 100.

In some embodiments, the upper header 110 may have a rectangular, diamond, circular, oval, or triangular cross-sectional shaped arm 115. The upper header 110 may be formed of a thin plate of durable material, for example, steel or other material, to provide structural stability. The exemplary steel header may be hot dipped galvanized after fabrication for corrosion resistance. The thickness may be selected to reduce clogging of the plurality of orifices 118. Exemplary thickness may be less than 1 inch (25.4 mm), for example, about 0.5 in (12.7 mm) or about 0.25 in (6.35 mm). The upper header 110 may have a tapered design selected to provide uniform sludge withdrawal velocity along a length of arm portion 115. For instance, the upper header 110 may have a cross-section decreasing from the proximal end to the distal end of the arm portion 115. The uniform sludge withdrawal velocity may generally prevent sludge build-up along the arm portion 115 or orifice 118 clogging.

In some embodiments, the upper header 110 may be mounted substantially parallel to a bottom surface of the clarifier 100, for example, the angle from the center shaft 102 to a distal end of the arm portion 115 may be about 85°-95°, or about 90°. In other embodiments, the upper header 110 may be mounted at an angle selected to physically and hydraulically trap the sludge. The angle from the center shaft 102 to the distal end of the arm portion 115 may be 30°-60°, or about 30°, 35°, 40°, 45°, 50°, 55°, or 60°. In some embodiments, the upper header 110 may have a peaked top along the arm portion 115. The peaked top may be selected to prevent sludge from collecting on the header.

To provide proportional withdrawal and headloss characteristics, properties of the upper header 110 may be independently selected or designed for the target application. For instance, the upper header 110 may be designed using a computer simulation to achieve correct hydraulic and mathematical balances.

Figure 4:
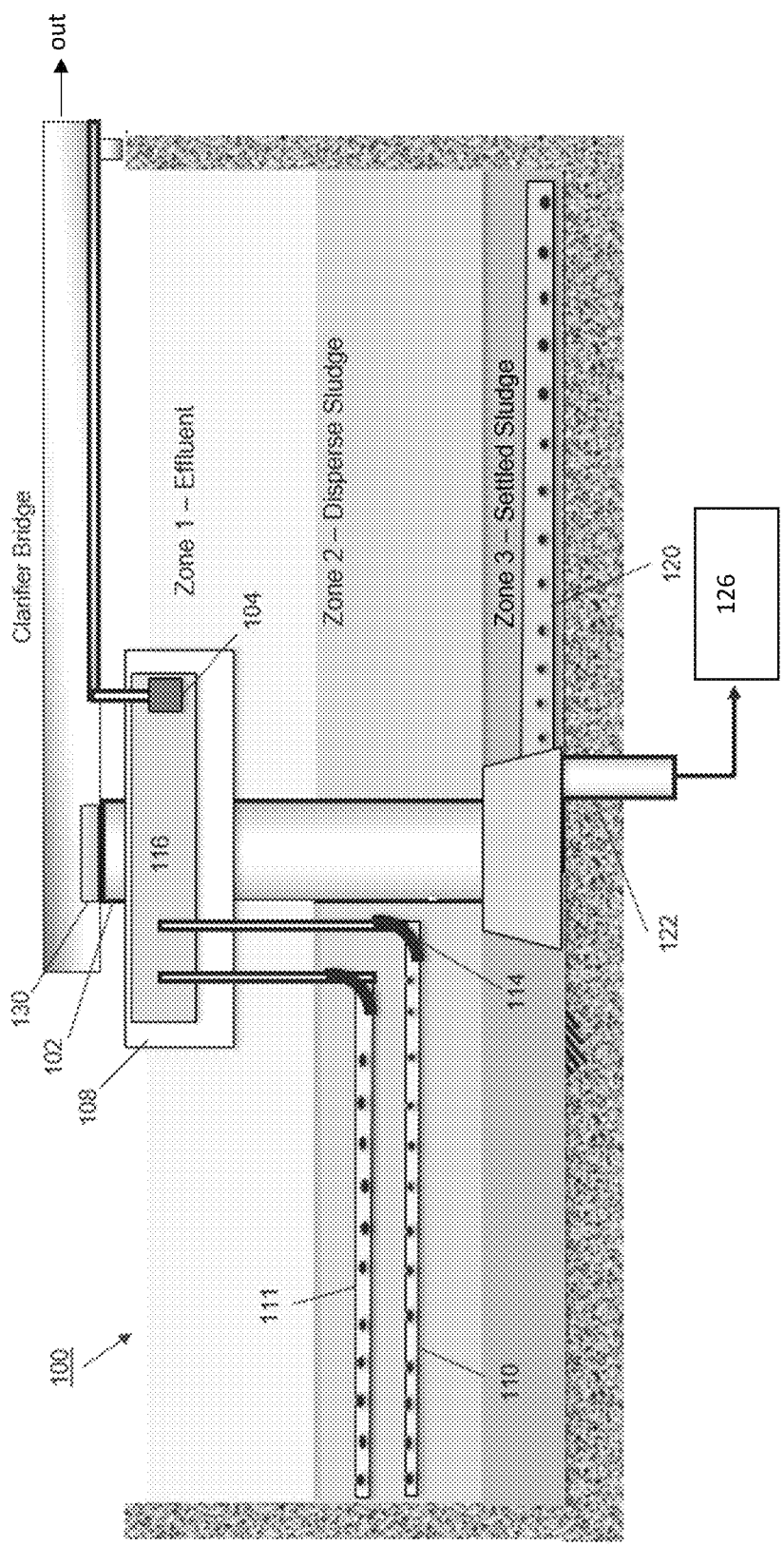
FIG. 4 is a schematic drawing of an apparatus for wasting flocculant sludge from a clarifier, according to one embodiment.

The apparatus may comprise a lower header 120 extending radially from the center shaft 102. The lower header 120 may be positioned within a settled sludge zone of the clarifier 100. In some embodiments, the lower header 120 may be positioned at a fixed height along the center shaft 102. In other embodiments, the lower header 120 may be positioned at an adjustable height along the center shaft 102. An exemplary lower header is the Tow-Bro® (Evoqua Water Technologies LLC, Pittsburgh, PA) header, as shown in FIG. 4.

The lower header 120 may be similar in construction to the upper header 110. For instance, the lower header 120 may comprise a ring portion and an arm portion. The lower header 120 may additionally comprise a conduit having a plurality of orifices 119 dimensioned to collect settled sludge. The plurality of orifices 119 may have a predetermined size and spacing selected for the lower header 120, as previously described with respect to the upper header 110. The lower header 120 may have a similar construction, for example, cross-sectional area profile and mounting position, as previously described with respect to the upper header 110. Additionally, the lower header 120 may be designed for the target application, as previously described with respect to the upper header 110.

The lower header 120 may have an outlet fluidly connected to a return sludge pipe 122 inlet. The return sludge pipe 122 may have an outlet fluidly connectable to a return sludge well 126 (shown in more detail in FIG. 6). The drive mechanism 130 may rotate the lower header 120 about a center axis of the clarifier 100, as previously described with respect to the upper header 110.

In some embodiments, the upper header 110 and the lower header 120 may extend radially in a substantially similar direction. For instance, the drive mechanism 130 may be configured to rotate the upper header 110 and the lower header 120 positioned in substantially similar directions at a similar rotation speed. In other embodiments, the upper header 110 and the lower header 120 may extend radially in offset directions. The upper header 110 and the lower header 120 may extend in offset directions by a predetermined angle, for example, about 45°-90°, 90°-135°, or 135°-180°. The drive mechanism 130 may be configured to rotate the upper header 110 and the lower header 120 at a substantially similar rotation speed or independently. A rotation speed of the upper header 110 may be selected and controlled independently from a selection and control of the rotation speed of the lower header 120.

The apparatus may further comprise a vacuum source 104 configured to provide suction to the upper header 110. The vacuum source 104 may be a pump as shown in FIGS. 2 and 4. In other embodiments, the vacuum source may utilize a hydraulic differential pressure to direct the flocculant sludge to the waste conduit 116.

Figure 6:
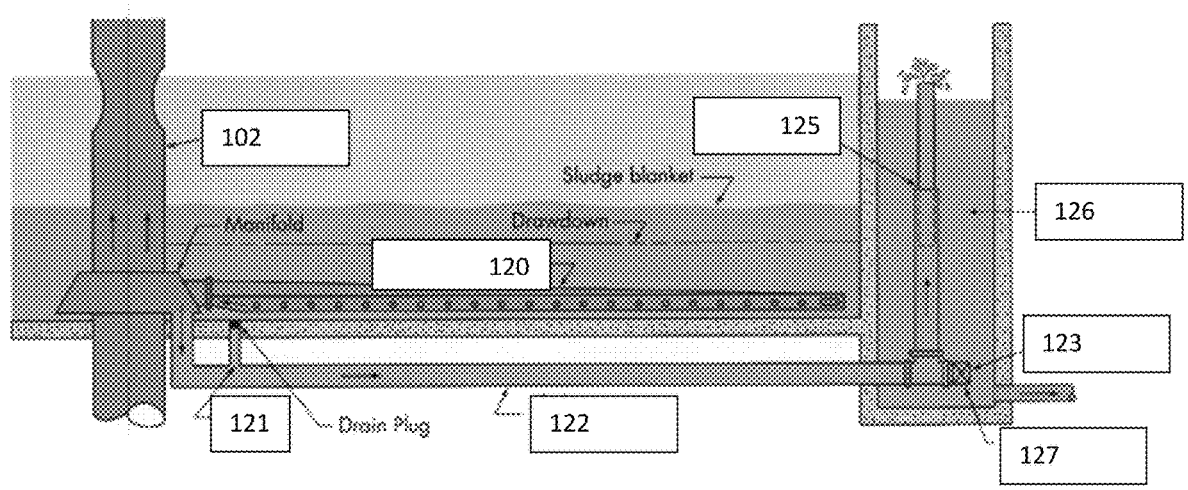
FIG. 6 is a schematic drawing of an apparatus for recovering settled sludge from a clarifier, according to one embodiment.

In some embodiments, a vacuum source may apply suction to the lower header 120, as shown in FIG. 6. The vacuum source may be, for example, a pump or a valve, such as a telescoping valve, which produces a hydraulic differential pressure. In some embodiments, the return sludge well 126 may comprise a telescoping sludge valve 125 configured to provide a hydraulic differential pressure effective to direct the settled sludge to the return sludge well 126 via the return sludge pipe 122. A pump 123 may additionally or alternatively provide suction. The return sludge well 126 may comprise a drain valve 127. In some embodiments, settled sludge may be periodically wasted from the return sludge well 126. In some embodiments, the return sludge pipe 122 may be fluidly connected to a clarifier drain 121 configured to refluidize the settled sludge withdrawn through the lower header 120 when necessary.

Another embodiment of the apparatus is shown in FIG. 2. The apparatus of FIG. 2 is similar to the apparatus of FIG. 1, except that it includes an internal waste conduit 116, vacuum source 104, and wasting pipe 112 is external to the center shaft 102 conduit.

Figure 3:
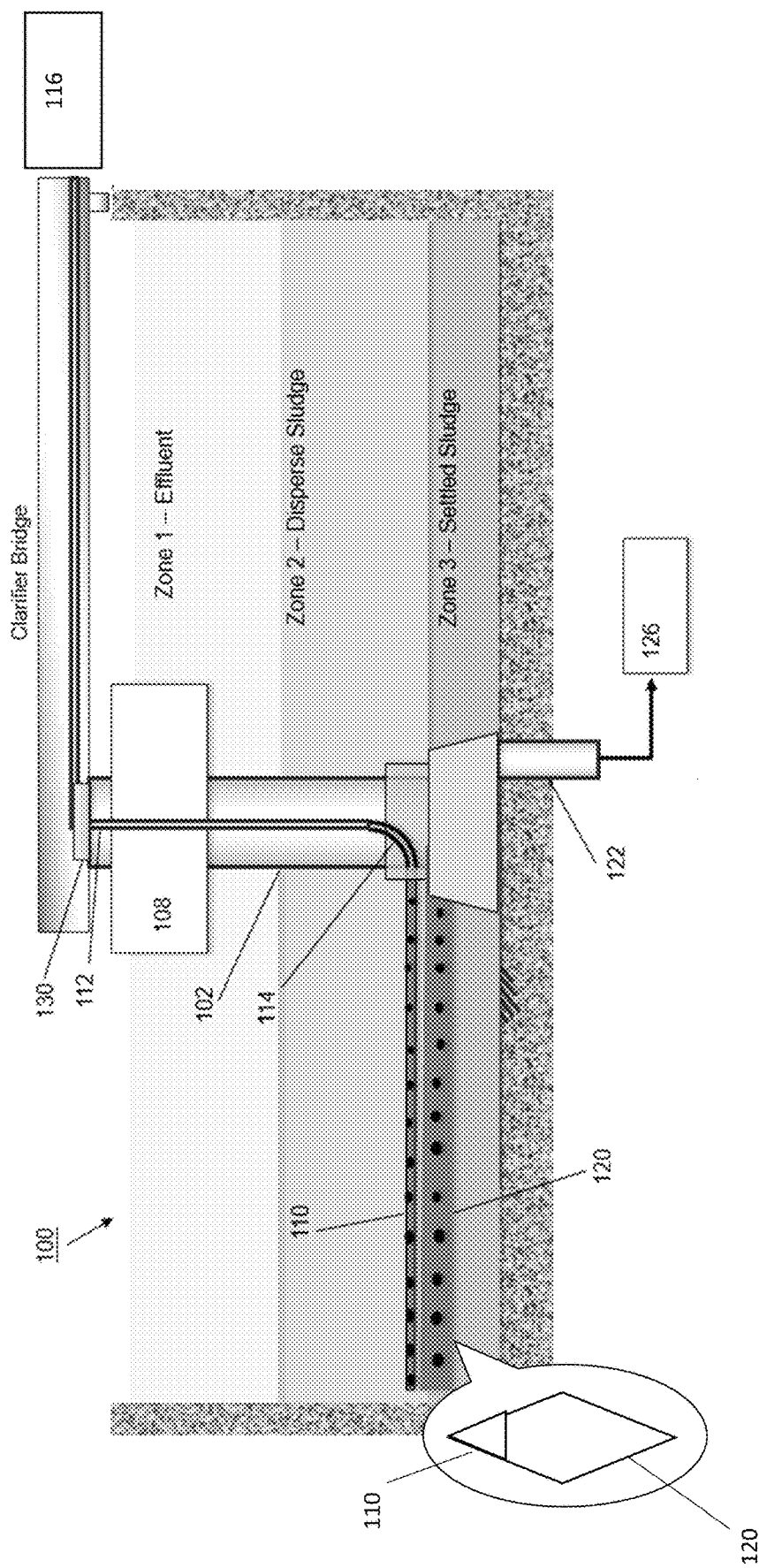
FIG. 3 a schematic drawing of an apparatus for wasting flocculant sludge from a clarifier including a side cross-sectional view of the header, according to one embodiment.

In some embodiments, the waste conduit 116 may be external to the clarifier 100, as shown in FIGS. 1 and 3 (wasting pipe 112 runs along a bridge to an external waste conduit 116). In other embodiments, as shown in FIGS. 2 and 4, the waste conduit 116 may be internal to the clarifier 100. In such embodiments, the vacuum source 104 may be a pump positioned within the waste conduit 116 or the vacuum source 104 may be generated by hydraulic differential pressure, for example, as controlled by a valve.

Another embodiment of the apparatus is shown in FIG. 4. The apparatus of FIG. 4 is similar to the apparatus of FIG. 2, except that it includes a second upper header 111. Second upper header 111 may extend radially from the center shaft 102 and be positioned above the upper header 110. Second upper header 111 is shown in FIG. 4 with a respective manifold and wasting pipe. However, second upper header 111 may be fluidly connected to a manifold and/or wasting pipe shared with upper header 110. In general, the upper header 110 and second upper header 111 may be positioned at an adjustable height, such that they may each independently be movable along the center shaft 102. The upper header 110 and second upper header 111 may be movable along the center shaft 102 to correspond with the disperse sludge zone.

In some embodiments, as shown in FIG. 3, the upper header 110 and the lower header 120 may be fixed to create a dual conduit header. The upper header 110 conduit may form 25%-50% of the cross-sectional area of the dual header, for example, about 25%, 33%, or 50%. The lower header 120 conduit may form 50%-75% of the cross-sectional area of the header, for example, about 50%, 66%, or 75%. The dual conduit header may have a plurality of orifices that correspond to a conduit of the upper header 110 and a plurality of orifices that correspond to a conduit of the lower header 120. Each of the upper header 110 and the lower header 120 may be fluidly connected to the wasting pipe 112 or the return sludge pipe inlet 122, respectively, as previously described. The dual conduit header may be positioned at an adjustable height along the center shaft 102. For instance, the dual conduit header may be movable along the center shaft 102 to correspond with an interface between the disperse sludge zone and the settled sludge zone of the clarifier 100.

Figure 5:
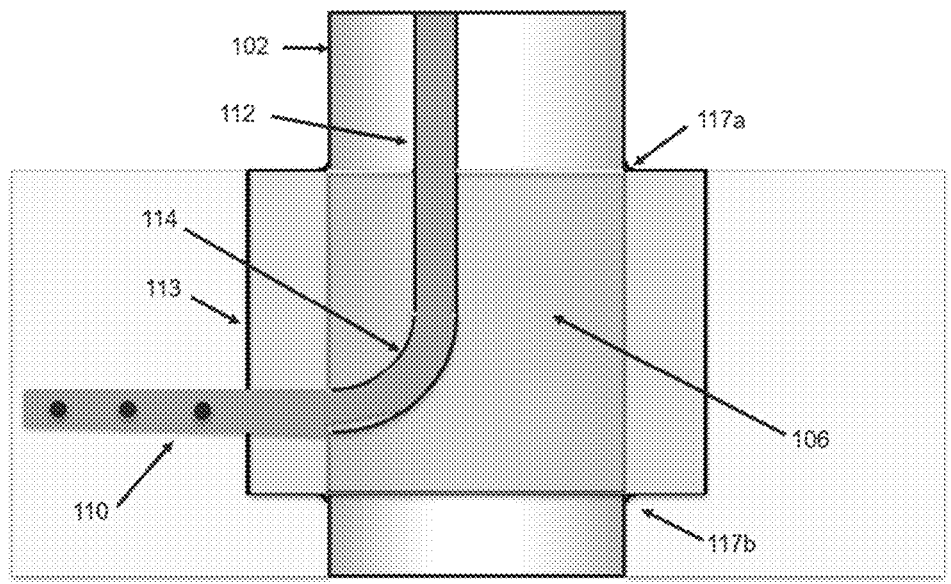
FIG. 5 is a partial view of an apparatus for wasting flocculant sludge from a clarifier, according to one embodiment.

FIG. 5 is a partial view of an apparatus for wasting flocculant sludge, as shown in FIGS. 1-4. The partial view of FIG. 5 shows manifold 114 attached to a ring portion 113 of the upper header 110. Ring portion 113 rotates with rotation of the upper header 110. Manifold 114 is fluidly connected to wasting pipe 112 within center shaft 102. A seal 117a/117b on the top and/or bottom of ring portion 113 seals against influent pipe 106. The seal may be a neoprene seal or any other material suitable to seal against fluids.

Figure 7:
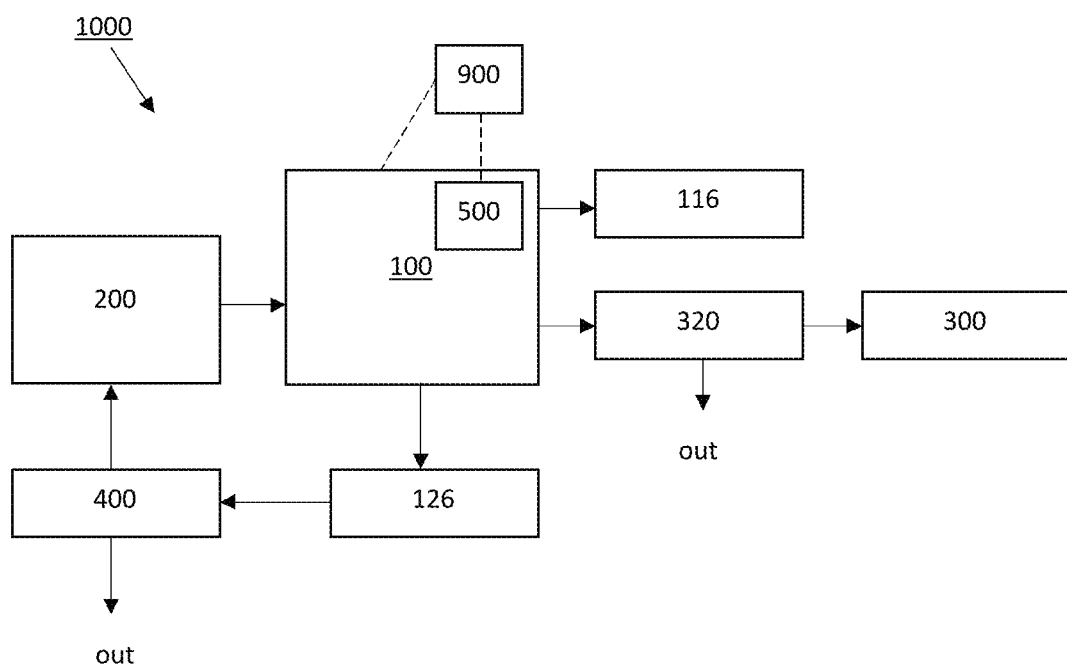
FIG. 7 is a box diagram of a system for treatment of wastewater, according to one embodiment.

In accordance with certain embodiments, there is provided a wastewater treatment system. FIG. 7 is a box diagram of wastewater treatment system 1000. System 1000 includes the apparatus for wasting flocculant sludge previously described positioned in clarifier 100. The clarifier 100 may comprise a center shaft, as previously described. The clarifier 100 may have an inlet fluidly connectable to a source of a mixed liquor 200. The source of a mixed liquor 200 may be a biological treatment unit or a component of a biological treatment system, as previously described. The clarifier 100 may have an effluent outlet. The effluent outlet may be fluidly connectable to a treated water use 300, for example, a municipal or industrial treated water use. In some embodiments, the effluent outlet may be fluidly connected to a downstream post-treatment unit 320, such as a polishing unit or a return activated sludge capture unit, positioned upstream from the treated water use 300.

As the term is used herein, an "upstream" unit operation refers to a first unit operation which is performed upon a fluid undergoing treatment prior to a second unit operation. Similarly, an "upstream" treatment vessel or portion thereof refers to a first treatment vessel or portion thereof in which a first unit operation is performed prior to a second unit operation performed in a second treatment vessel or portion thereof.

A "downstream" unit operation refers to a second unit operation which is performed upon a fluid undergoing treatment subsequent to a first unit operation. Similarly, a "downstream" treatment vessel or portion thereof refers to a second treatment vessel or portion thereof in which a second unit operation is performed subsequent to a first unit operation performed in a first treatment vessel or portion thereof.

An upstream unit operation and/or treatment vessel having an outlet in "direct fluid communication" with an inlet of a downstream unit operation and/or treatment vessel directs material output from the outlet of the upstream unit operation and/or treatment vessel into the inlet of the downstream unit operation and/or treatment vessel without any intervening operations performed on the material. A first unit operation and/or treatment vessel described herein as being in fluid communication with a second unit operation and/or treatment vessel should be understood as being in direct fluid communication with the second unit operation and/or treatment vessel unless explicitly described as otherwise. Conduits which provide fluid communication between a first and a second unit operation and/or treatment vessel are to be understood as providing direct fluid communication between the first and second unit operation and/or treatment vessel unless explicitly described as otherwise.

Various unit operations and/or treatment vessels disclosed herein separate fluid and/or sludge into a solids-rich portion and a solids-lean portion wherein the solids-lean portion has a lower concentration of solids than the solids-rich portion. As the term is used herein, an "effluent" of a unit operation and/or treatment vessel refers to the solids-lean portion of the separated fluid and/or sludge. "Recycle" of material refers to directing material from an outlet of a downstream unit operation and/or treatment vessel to an inlet of a unit operation and/or treatment vessel upstream of the downstream unit operation and/or treatment vessel.

The wastewater treatment system 1000 may include a waste conduit 116 fluidly connected to the wasting pipe outlet.

The wastewater treatment system 1000 may include a return sludge well 126 fluidly connected to the return sludge pipe. The return sludge well 126 may be fluidly connected to an upstream unit operation, such as the source of the mixed liquor 200. For example, in some embodiments, the return sludge well may be fluidly connected to a biological treatment unit or a component of a biological treatment system. A return activated sludge capture unit 400 may be positioned downstream from the return sludge well 126.

In some embodiments, the wastewater treatment system 1000 may comprise one or more controllers 900 (shown as a single controller in FIG. 7). The controller 900 may be operatively connected to the upper header 110 and configured to direct the upper header 100 along the center shaft, for example, to position the upper header 110 within the disperse sludge zone, as previously described. The controller 900 may be configured to operate the upper header 110 automatically, for example, according to a predetermined schedule, manually, or responsive to a received signal, for example, a measurement or other indication of system status.

In some embodiments, controller 900 (or an alternate controller) may be operatively connected to drive mechanism 130. Controller 900 may be configured to rotate upper header 110 about a center axis of the clarifier 100. Controller 900 may be configured to rotate lower header 120 about a center axis of the clarifier 100. Thus, controller 900 may be configured to control rotation speed of the upper header 110 and/or the lower header 120, as previously described. The controller 900 may be configured to operate the drive mechanism 130 automatically, for example, according to a predetermined schedule, manually, or responsive to a received signal, for example, a measurement or other indication of system status.

In some embodiments, the wastewater treatment system 1000 may further comprise a composition sensor 500 fluidly connected to the waste conduit 116 and operably connected to the controller 900. The composition sensor 500 may be configured to measure a relative concentration of flocculant sludge and settled sludge directed to the waste conduit 116. The controller 900 may be configured to control the height of the upper header 110 responsive to a measurement obtained by the composition sensor 500. In some embodiments, the controller 900 may be configured to control rotation speed of the upper header 110 and/or the lower header 120 responsive to a measurement obtained by the composition sensor 500.

The controller 900 may be associated with or more processors typically connected to one or more memory devices, which can comprise, for example, any one or more of a disk drive memory, a flash memory device, a RAM memory device, or other device for storing data. The memory device may be used for storing programs and data during operation of the system. For example, the memory device may be used for storing historical data relating to the parameters over a period of time, as well as operating data. In some embodiments, the controller(s) disclosed herein may be operably connected to an external data storage. For instance, the controller may be operable connected to an external server and/or a cloud data storage.

Any controller(s) disclosed herein may be a computer or mobile device or may be operably connected to a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source.

The controller(s) disclosed herein may be digitally connected to the one or more components. The controller may be connected to the one or more components through a wireless connection. For example, the controller may be connected through wireless local area networking (WLAN) or short-wavelength ultra-high frequency (UHF) radio waves. The controller may further be operably connected to any additional pump or valve within the system, for example, to enable the controller to direct fluids or additives as needed. The controller may be coupled to a memory storing device or cloud-based memory storage.

The controller(s) disclosed herein may be configured to transmit data to a memory storing device or a cloud-based memory storage. Such data may include, for example, operating parameters, measurements, and/or status indicators of the system components. The externally stored data may be accessed through a computer or mobile device. In some embodiments, the controller or a processor associated with the external memory storage may be configured to notify a user of an operating parameter, measurement, and/or status of the system components. For instance, a notification may be pushed to a computer or mobile device notifying the user. Operating parameters and measurements include, for example, properties of the wastewater to be treated or a mixed liquor, properties of the partially settled mixed liquor within the clarifier, properties of the waste, and/or properties of the return sludge. Status of the system components may include, for example, rotation speeds of the upper header 110 and/or lower header 120, height of the upper header 110, settle times, and whether any system component requires regular or unplanned maintenance. However, the notification may relate to any operating parameter, measurement, or status of a system component disclosed herein. The controller may further be configured to access data from the memory storing device or cloud-based memory storage. In certain embodiments, information, such as system updates, may be transmitted to the controller from an external source.

Multiple controllers may be programmed to work together to operate the system. For example, one or more controller may be programmed to work with an external computing device. In some embodiments, the controller and computing device may be integrated. In other embodiments, one or more of the processes disclosed herein may be manually or semi-automatically executed.

Methods of retrofitting a clarifier or wastewater treatment system are also disclosed. The methods may comprise providing any one or more component of the apparatus for wasting flocculant sludge or wastewater treatment system disclosed herein. For instance, the methods may comprise providing one or more of a manifold, a wasting pipe, an upper header, and a drive mechanism. In some embodiments, the methods may comprise installing one or more of the manifold, wasting pipe, upper header, and drive mechanism to operate as previously described. In some embodiments, the methods may comprise providing instructions to install one or more of the manifold, wasting pipe, upper header, and drive mechanism as previously described. Such methods of retrofitting may be performed on a clarifier that has a lower header or other settled sludge recovery mechanism.

In some embodiments, the methods of retrofitting may be performed on a clarifier that does not have a lower header. The methods may comprise providing one or more of a lower header, a return sludge pipe, and a return sludge well. In some embodiments, the methods may comprise installing one or more of the lower header, return sludge pipe, and return sludge well to operate as previously described. In some embodiments, the methods may comprise providing instructions to install one or more of the lower header, return sludge pipe, and return sludge well as previously described.

In certain embodiments, the method may comprise providing a second upper header. The methods may comprise installing the second upper header to operate as previously described. The methods may comprise providing instructions to install the second upper header.

In certain embodiments, the method may comprise providing a vacuum source. The methods may comprise installing the vacuum source to operate as previously described. The methods may comprise providing instructions to install the vacuum source.

In certain embodiments, the method may comprise providing a controller. The methods may comprise installing the controller to operate as previously described. For instance, the methods may comprise operably connecting the controller to the upper header, lower header, and/or drive mechanism. The methods may comprise operably connecting the controller to one or more valve or pump of the system. The methods may comprise programming the controller to operate as previously described. The methods may comprise providing instructions to install or program the controller as previously described.

In certain embodiments, the method may comprise providing a composition sensor. The methods may comprise installing the composition sensor to operate as previously described. For instance, the methods may comprise fluidly connecting the composition sensor to the waste conduit. The methods may comprise operably connecting the controller to the composition sensor. The methods may comprise providing instructions to install the composition sensor.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An apparatus for wasting flocculant sludge from a clarifier having a center shaft positioned upright in the clarifier, the apparatus comprising:
a wasting pipe having an inlet and an outlet fluidly connectable to a waste conduit;
a manifold having an inlet and an outlet fluidly connected to the wasting pipe inlet;
an upper header extending radially from the center shaft comprising a conduit having a plurality of orifices dimensioned to collect the flocculant sludge and an outlet fluidly connected to the manifold inlet, the upper header being configured to be positioned within a disperse sludge zone of the clarifier, the upper header being constructed and arranged to be positionable at an adjustable height along the center shaft, the upper header being operably connectable to a controller configured to direct the upper header along the center shaft;
a return sludge pipe having an inlet and an outlet fluidly connectable to a return sludge well;
a lower header extending radially from the center shaft comprising a conduit having a plurality of orifices dimensioned to collect settled sludge and an outlet fluidly connected to the return sludge pipe inlet, the lower header being configured to be positioned within a settled sludge zone of the clarifier; and
a drive mechanism configured to rotate the upper header and the lower header about a center axis of the clarifier.

2. The apparatus of claim 1, wherein the upper header and the lower header are constructed and arranged to extend radially in a substantially similar direction.

3. The apparatus of claim 2, wherein the upper header and the lower header are fixed to create a dual conduit header.

4. The apparatus of claim 1, wherein the upper header and the lower header are constructed and arranged to extend radially in offset directions.

5. The apparatus of claim 4, wherein the upper header and the lower header are constructed and arranged to rotate independently.

6. The apparatus of claim 1, further comprising a vacuum source configured to provide suction to the plurality of orifices of the upper header.

7. The apparatus of claim 1, wherein the upper header comprises a first arm portion extending radially in a first direction and a second arm portion extending radially in a second direction.

8. The apparatus of claim 1, further comprising a second upper header extending radially from the center shaft constructed and arranged to be positioned above the upper header within the disperse sludge zone.

9. The apparatus of claim 1, wherein the plurality of orifices of the upper header are positioned with a predetermined spacing along the upper header to collect the flocculant sludge.

10. A wastewater treatment system, comprising:
a clarifier having an inlet fluidly connectable to a source of a mixed liquor and an effluent outlet and comprising a center shaft positioned upright in the clarifier;
a wasting pipe having an inlet and an outlet fluidly connectable to a waste conduit;
a manifold having an inlet and an outlet fluidly connected to the wasting pipe inlet;
an upper header extending radially from the center shaft positioned within a disperse sludge zone of the clarifier and comprising a conduit having a flocculant sludge inlet and an outlet fluidly connected to the manifold inlet, the upper header being positionable at an adjustable height along the center shaft;
a controller configured to direct the upper header along the center shaft;
a return sludge well having an inlet and an outlet fluidly connectable to the source of the mixed liquor;
a return sludge pipe having an inlet and an outlet fluidly connectable to the return sludge well; and
a lower header extending radially from the center shaft positioned within a settled sludge zone of the clarifier and comprising a conduit having a settled sludge inlet and an outlet fluidly connected to the return sludge pipe inlet.

11. The system of claim 10, further comprising a pump configured to direct the flocculant sludge to the waste conduit.

12. The system of claim 10, wherein the return sludge well comprises a telescoping sludge valve configured to provide a hydraulic differential pressure effective to direct the settled sludge to the return sludge well.

13. The system of claim 10, further comprising a composition sensor fluidly connected to the waste conduit and operably connected to the controller, the controller configured to control the height of the upper header responsive to a measurement obtained by the composition sensor.

14. The system of claim 10, further comprising a drive mechanism configured to rotate the upper header about a center axis of the clarifier and a second controller operably connected to the drive mechanism and configured to direct a rotation speed of the upper header.

15. A method of retrofitting a clarifier comprising a center shaft positioned upright in the clarifier, the method comprising:
providing a manifold having an inlet and an outlet;
providing an upper header constructed and arranged to extend radially from the center shaft comprising a conduit having a plurality of orifices and an outlet fluidly connectable to the manifold inlet, the upper header being configured to be positioned within a disperse sludge zone of the clarifier, the upper header being constructed and arranged to be positionable at an adjustable height along the center shaft;
providing a controller configured to direct the upper header along the center shaft;
providing a drive mechanism configured to rotate the upper header about a center axis of the clarifier; and
providing a wasting pipe having an inlet and an outlet fluidly connectable to a waste conduit, the manifold outlet being fluidly connectable to the wasting pipe inlet.

16. The method of claim 15, further comprising providing a lower header constructed and arranged to extend radially from the center shaft comprising a conduit having a plurality of orifices and an outlet.

17. The method of claim 16, further comprising providing a return sludge pipe having an inlet and an outlet fluidly connectable to a return sludge well, the lower header outlet being fluidly connectable to the return sludge pipe inlet.

18. The method of claim 15, further comprising providing a vacuum source configured to provide suction to the plurality of orifices of the upper header.

19. The apparatus of claim 1, wherein the controller is operably connectable to a composition sensor fluidly connectable to the waste conduit, the controller configured to control the height of the upper header responsive to a measurement obtained by the composition sensor.

20. The method of claim 15, further comprising providing a composition sensor fluidly connectable to the waste conduit and operably connectable to the controller, the controller configured to control the height of the upper header responsive to a measurement obtained by the composition sensor.

\* \* \* \* \*